United States Patent [19]

Hadley et al.

[11] Patent Number: 5,024,456
[45] Date of Patent: Jun. 18, 1991

[54] TWO UNIT FOLDING HITCH STRUCTURES

[75] Inventors: Howard C. Hadley, Des Moines; John R. Myers, Polk City, both of Iowa

[73] Assignee: Deere & Company, Moline, Ill.

[21] Appl. No.: 378,877

[22] Filed: Jul. 12, 1989

[51] Int. Cl.⁵ .............................................. B60D 1/00
[52] U.S. Cl. .................................... 280/412; 172/311
[58] Field of Search ..................... 280/411.1, 412, 413, 280/462, 463, 467, 468, 472; 172/311

[56] References Cited

U.S. PATENT DOCUMENTS

| | | | |
|---|---|---|---|
| 3,948,327 | 4/1976 | Parker et al. | 172/311 |
| 3,967,684 | 7/1976 | Haverdink | 172/311 |
| 4,178,010 | 12/1979 | Gerber | 280/412 |
| 4,213,628 | 7/1980 | Hardesty | 280/412 |
| 4,260,172 | 4/1981 | Rettig et al. | 280 X/412 |
| 4,504,076 | 3/1985 | Bedney | 280 X/412 |
| 4,577,881 | 3/1986 | Gerber | 280/412 |

Primary Examiner—Charles A. Marmor
Assistant Examiner—Alan M. Kagen

[57] ABSTRACT

Hitch structure for towing first and second implements forwardly one behind the other in a transport position and in a side-by-side relationship in a field-working position. The hitch structure includes an elongated rear hitch pivotally connected to a rear corner of the first implement by a 180 degree horizontally folding hinge and rockable by a rear hydraulic cylinder between a transport position wherein the rear hitch connector for the second implement is centered behind the first implement, and a field-working position wherein the connector is offset to one side of the first implement. A fore-and-aft extending forward hitch includes an aft end pivotally connected to the first implement at a location offset to the side of the implement and a forward connecting end attached to a towing vehicle. A forward hydraulic cylinder rocks the forward connecting end between a transport position, generally centered with respect to the first implement, and a field-working position wherein the forward connecting end is centrally positioned between the implements. A rear hitch brace is responsive to forward hitch movement to automatically move into and out of a latching support position as the implements are moved to and from the field-working position.

20 Claims, 3 Drawing Sheets

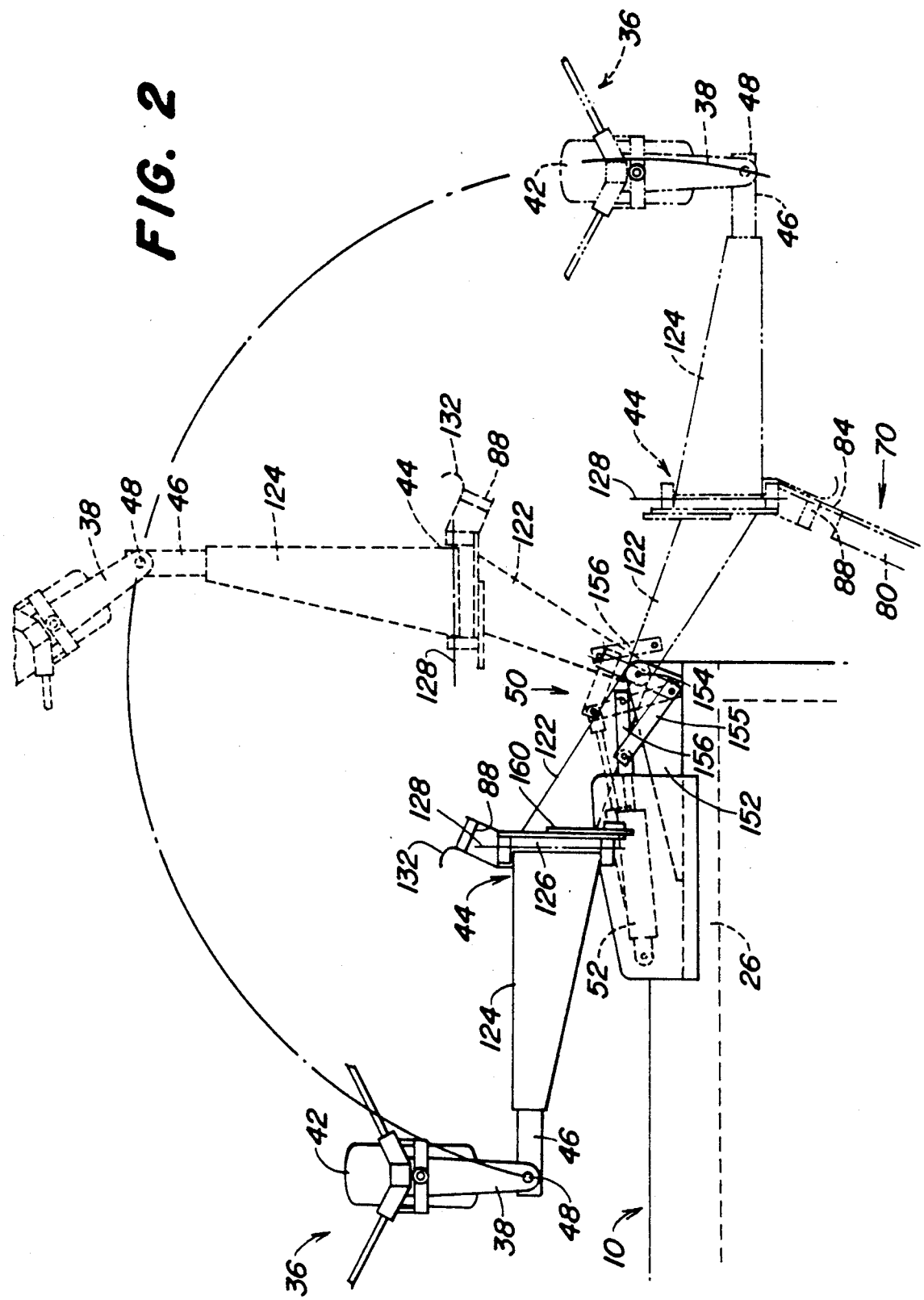

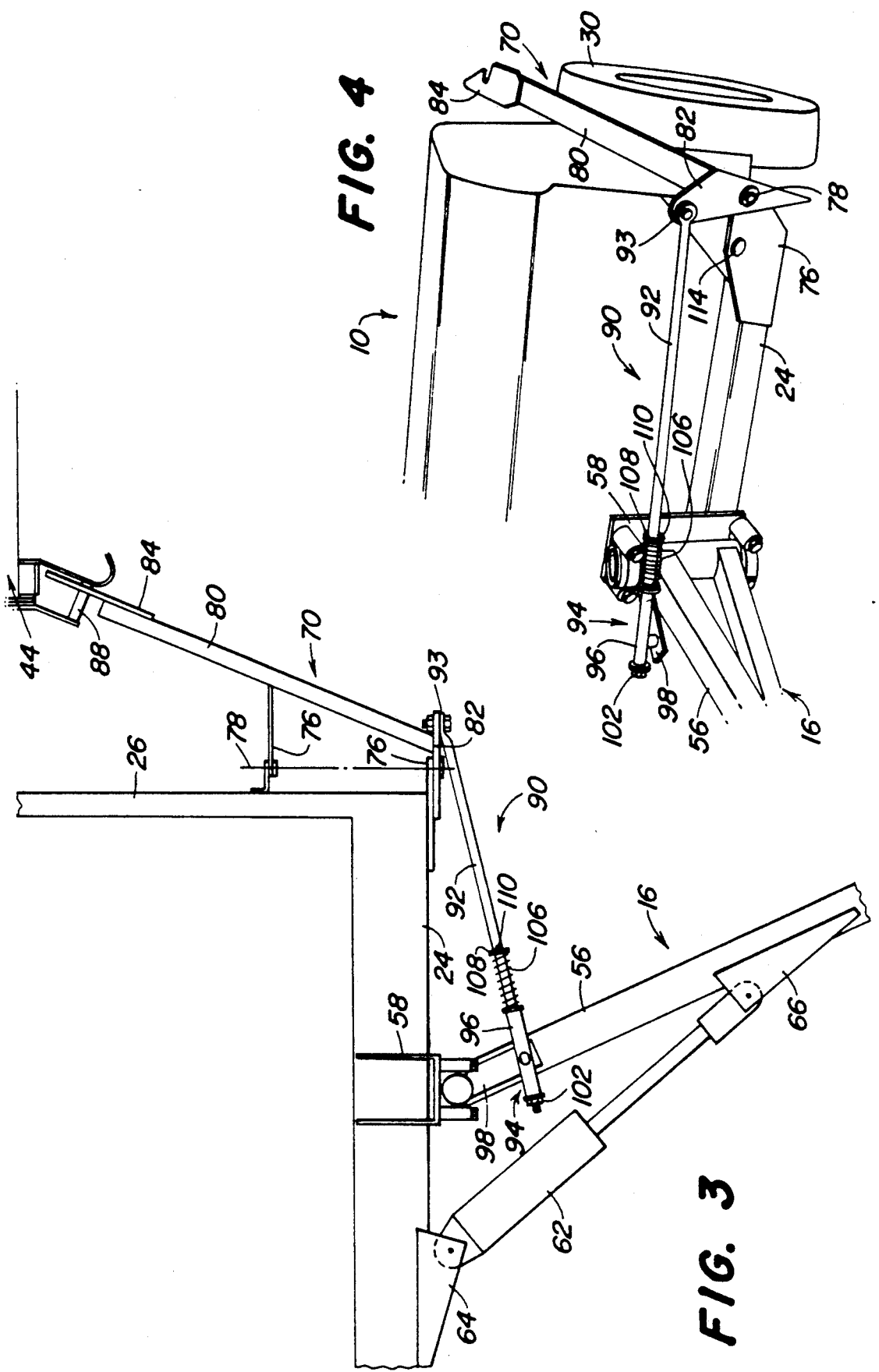

TWO UNIT FOLDING HITCH STRUCTURES

BACKGROUND OF THE INVENTION

1. Field of the Invention

The present invention relates generally to towed agricultural implements, and more specifically to a hithc structure for towing two implements in either a narrow transport position or a wide field-working position.

2. Description of the Prior Art

To increase productivity, the field-working width is increased by pulling two or more similar implements in a side-by-side relationship. Transporting multiple implements has required special hitch structure to reorient the units for a narrower transport width. Numerous structures are available including endwise transport hitches such as shown in U.S Pat. No. 4,260,172; large pivoting overhead tow bar arrangements for moving one implement behind the other such as shown is U.S. Pat. No. 4,577,881; and forward-folding hitches such as exemplified in U.S. Pat. No. 4,504,076. Disadvantages of the previously available structures include excess size and weight, high cost, awkwardness of operation, and a less than desirable field-working position. Many of the structures require a very large area to convert between field-working and transport positions.

BRIEF DESCRIPTION OF THE INVENTION

It is therefore an object of the present invention to provide an improved hitch structure for towing multiple implements. It is a further object to provide such a structure which overcomes the aforementioned problems.

It is yet another object to provide an improved hitch structure for towing a pair of implements side-by-side in the field and one behind the other during transport. It is still another object to provide such a structure which is relatively simple and inexpensive in construction and yet which is very easy to operate.

It is another object to provide an improved hitch structure for implements which require relatively little area for conversion between field-working and transport positions. It is still another object to provide such a structure which permits the implements to be operated in a desirable field-working position and to be moved easily to a compact transport position.

It is a further object of the present invention to provide an improved hitch structure for two implements which permits the implements to be towed in line centrally behind the tractor in a transport configuration, and one beside the other in a field-working position. It is a further object to provide such a structure which permits the conversion between field-working and transport positions to be completed quickly and easily and in a relatively small area.

It is a further object of the invention to provide an improved multiple implement arrangement wherein first and second implements are movable one behind the other for towing centrally behind a vehicle in a transport position, and one beside the other for towing in a wide field-working position.

In accordance with the above objects, hitch structure is provided which includes a horizontally disposed 180 degree folding rear hitch connected to the rear corner of the first implement. The hitch includes an implement connector movable from a central rearward position corresponding to the transport position, to an outwardly extending position corresponding to the field-working position.

The first implement includes a pivoting hitch connected to the first implement at a forward location offset to the same side of the implement as the rear folding hitch and rockable by a hydraulic cylinder between a transport position wherein the forward end of the hitch (which is connected to the tractor) is centered with respect to the implement, and a field-working position wherein the forward end is offset toward the side of the implement. The cylinder is plumbed in parallel with an actuating cylinder connected to the rear folding hitch so that upon extension of the cylinders, the front and rear hitches move toward their transport positions. A second implement is pinned to the rear hitch connector for movement with the hitch between a central trailing position behind the first implement and a field-working position alongside the first implement A hinged brace is pivotally connected to the first implement and is automatically moved into latched relationship with the rear folding hitch as the second implement is moved toward the field-working position.

The hitch design is compact and cost-effective. The entire folding and unfolding sequence can be substantially completed hydraulically without need for the operator to leave the tractor cab. Good field-working positioning of the implements is provided, and a narrow and stable transport configuration is also facilitated by the hitch structure. Conversion between the field-working and transport positions is easy and requires relatively little space.

These and other objects, features and advantages of the present invention will become apparent to one skilled in the art upon reading the following detailed description in view of the drawings.

BRIEF DESCRIPTION OF THE DRAWINGS

FIG. 2 is an enlarged top view of the rear hitch shown in FIG. 1 and showing the movement of the rear hitch from the transport position (solid lines) to the field-working position (outermost broken lines).

FIG. 3 is an enlarged top view of the forward hitch and rear hitch brace in the field-working position.

FIG. 4. is a front perspective view of a portion of the front hitch and the rear hitch brace with the hitch structure in the transport position.

DESCRIPTION OF THE PREFERRED EMBODIMENT

Figure 1:
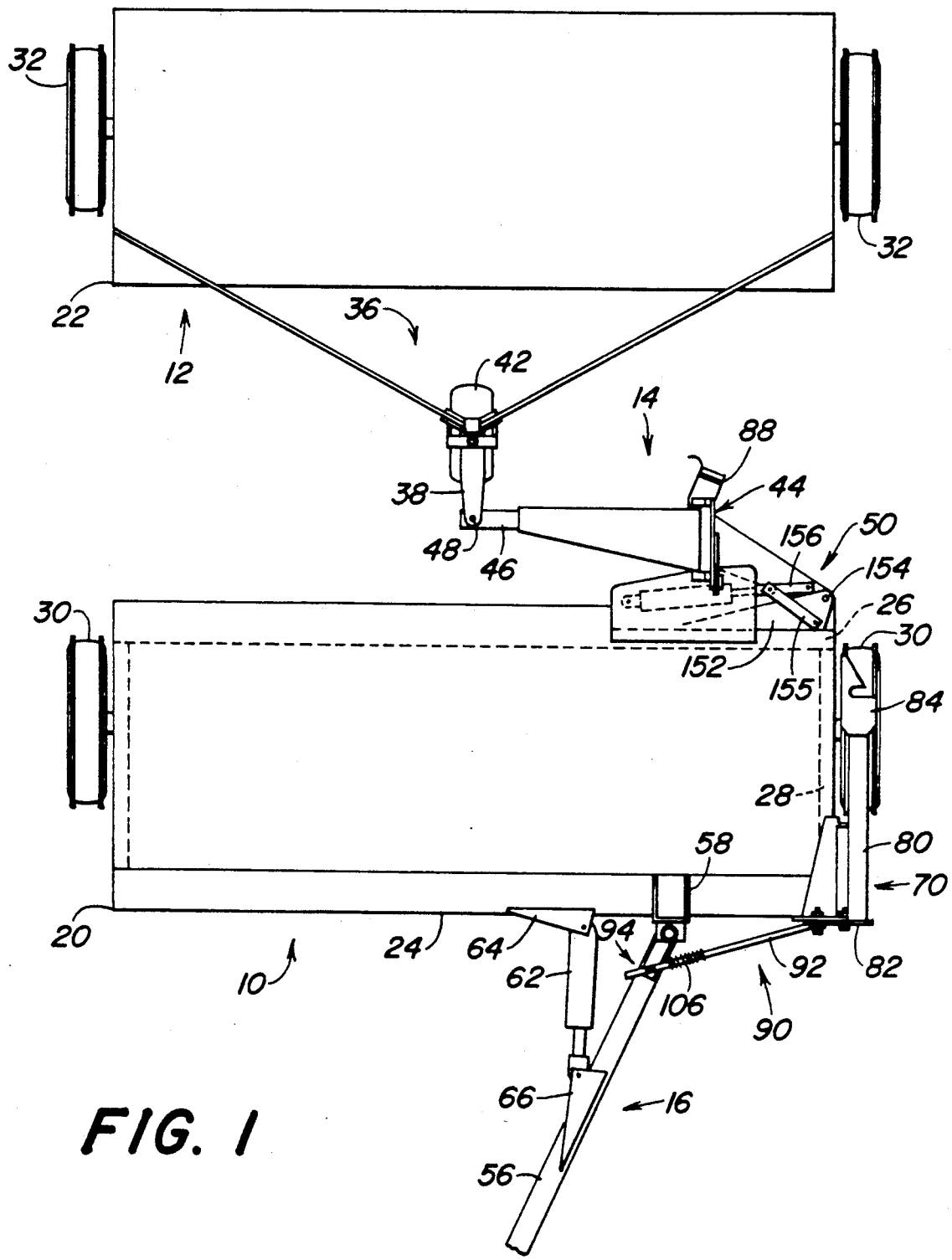
FIG. 1 is a top view of two implements connected by hitch structure and in the transport positions.

Referring now to FIG. 1, therein is shown first and second implements 10 and 12 connected by rear hitch structure 14. The first implement 10 includes forward hitch structure 16 having a conventional forward connector (not shown) pinned to the drawbar of a tractor or other towing vehicle. The implements 10 and 12 are shown as end wheel drills, but it is to be understood that the present invention could also be used with other implements as well. The implements 10 and 12 are similar in construction and include frames 20 and 22 which as viewed in FIG. 1 are generally rectangular in configuration with transversely extending front and rear main frame members 24 and 26 and fore-and-aft extending end members 28. The frames 10 and 12 are supported for forward movement over the ground by end wheels 30 and 32, respectively.

The implement 12 includes hitch structure 36 connected to the frame 22 and extending forwardly therefrom to a central hitch connector 38 supported above the ground by a caster wheel assembly 42. The rear hitch structure 14 includes an elongated hitch beam 44 having an aft end 46 which is connected to the hitch structure 36 by a pin 48. The forward end of the beam structure 44 is pivotally connected to the rear outside corner of the frame 20 by horizontally folding hinge structure 50 for rocking by a rear cylinder 52 between a transport position (FIG. 1 and solid lines of FIG. 2) and a field-working position (outermost broken lines of FIG. 2). The hitch beam 44 has an effective length approximately equal to half the working width of the implements and is rotatable approximately 180° so that the end 46 moves through an arc from a first position centrally located behind the implement 10 to an outermost position offset approximately half an implement width to the one side of the implement 10 and slightly forwardly of the rear corner for towing the implements in a side-by-side relationship through the field with the second implement 12 trailing the first.

The forward hitch structure 16 includes a main hitch beam 56 having an aft end pivotally connected to the forward transverse frame member 24 by a pivot bracket 58 for rocking about an upright axis located between the center and the one side of the implement 10. A hydraulic cylinder 62 is connected between the central portion of the frame member 24 and the beam 56 by brackets 64 and 66, respectively, for selectively rocking the beam 56 between a transport position (FIGA. 1 and 4) wherein the forward connecting end of the beam 56 which is pinned to the towing vehicle is centrally located between the ends of the implement 10, and a field-working position (FIG. 3) wherein the forward connecting end is offset to the one side of the implement 10 to center the implements 10 and 12 relative to the towing vehicle when they are in their field-working positions. Preferably, the cylinders 52 and 62 are plumbed in parallel and connected to an output of a hydraulic control valve (not shown) on the vehicle. A restrictor may be provided if necessary in the hydraulic circuit to assure that the cylinder 52 extends first to move the second implement 12 outwardly before the cylinder 62 fully extends to rock the hitch beam 56 to the field-working position.

Automatically engageable and disengageable hitch brace structure 70 is pivotally connected to the side frame member 26 by brackets 76 for rocking about a fore-and-aft extending axis 78 between an upwardly directed storage position (FIGS. 1 and 4) closely adjacent the one side of the implement 10, and an outwardly directed bracing position (FIG. 3) for engagement of the rear hitch beam 44 in the field-working position to lend stability to the rear hitch structure 14 and firmly fix the position of the beam 44 during field-working operations. The brace 70 includes a diagonally extending arm 80 having a forward end connected to a pivot plate 82 which is attached to the forward bracket 76 for rocking in a transversely extending upright plane about the axis 78. A hook-like member 84 is fixed to the aft end of the arm 80 and engages a mating bracket 88 which projects forwardly from the rear beam 44 when the beam is in the field-working position of FIG. 3.

The brace structure 70 includes activating structure, shown generally at 90, which is responsive to movement of the implements 10 and 12 toward their field-working positions to automatically move the arm 80 into the bracing position shown in FIG. 3. As shown, the activating structure 90 includes a rod or link 92 having an outermost eye end 93 pivotally connected to the upper portion of the pivot plate 82 and extending transversely therefrom to a lost motion connection 94 with the hitch structure 16. The connection 94 includes a trunnion 96 slidingly receiving the innermost end of the link 92 therethrough. The trunnion 96 is pivotally connected to an arm 98 projecting forwardly from the pivot bracket 58 and fixed for rocking with the main hitch beam 56. A nut 102 is threaded onto the end of the link 92 against a washer to prevent the link from sliding out of the trunnion 96. A coil spring 106 is received over a portion of the link 92 adjacent the trunnion 96 and is generally compressed between the trunnion and a washer 108 retained against sliding outwardly on the link by a retaining pin 110.

As the hitch beam 56 is pivoted from the transport position of FIGS. 1 and 4 toward the field-working position of FIG. 3, the trunnion 96 is moved toward the side by the arm 98 and acts against the spring 106 to urge the link 92 toward the right as viewed in the drawings. This movement of the link 92 pivots the plate 82 in the clockwise direction about the axis 78 and rocks the arm 80 toward the bracing position. Since the cylinder 52 extends to rock the rear hitch beam 44 to the final field-working position (outermost broken lines of FIG. 2) prior to full extension of the front cylinder 62, the bracket 88 will be positioned to receive the hook-like member 84 on the arm 80 as the arm is rocked downwardly and outwardly with the pivoting of the front hitch beam 56. A stop 114 (FIG. 4) fixed to the forward bracket 76 projects into the path of the lower portion of the plate 82 to limit plate rotation in the clockwise direction. To avoid damage to the activating structure 90, the spring 106 will compress to permit the link 92 to slide to the left in the trunnion 96 if the link 92 encounters excessive compressive forces.

Moving the front hitch beam 56 toward the transport position causes the link 92 to rotate plate 82 and arm 80 in the counterclockwise direction (FIG. 4) about the axis 78 to lift the hook-like member 84 from the bracket 88 and release the rear hitch beam 44 so that the beam 44 can be rotated back to the transport position by retraction of the cylinder 52. Therefore, the securing and releasing of the rear hitch beam 44 by the hitch brace 70 occurs automatically without need for the operator to leave his seat on the towing vehicle.

The hitch beam 44 preferably is a two-section, dog-legged structure with a forward portion 122 and an aft portion 124 connected by pivot structure 126 for rocking about a generally horizontal axis 128 (FIG. 2) to accommodate changes in height between the rear corner of the implement 10 and the hitch connector 38 on the rear implement 12. The dog-legged configuration helps provide advantageous positioning of the connecting end 46 closely adjacent the rear central portion of the implement 12 in the transport position, and alongside and slightly forward of the rear corner in the field-working position. The bracket 88, which is fixed to the forward portion 122, also supports a rounded rub plate 132 which prevents interference between the implements 10 and 12 during turns in the transport position.

The hinge structure 50 is preferably of the type shown and described in U.S. Pat. No. 3,967,684; however, the hinge is mounted for movement horizontally rather than vertically as shown in the patent. A bracket 152 is fixed to the rear outside corner of the implement 10 and supports a vertical pivot 154 which extends through the forward end of the beam portion 122. Toggle links 155, 156 are pivotally connected to the bracket 152 and the portion 122, respectively. The opposite ends of the links 155, 156 are pivotally connected to each other and to the rod end of the cylinder 52 so that upon extension of the cylinder 52 the hitch beam 44 will pivot outwardly as shown in FIG. 2. Retraction of the cylinder 52 rotates the beam 44 to the inwardly directed transport position. A latch 160 is connected between the beam 44 and the implement 10 to releasably secure the beam in the transport position.

In operation, assuming the implements are in the transport position shown in FIGS. 1 and 2, the operator releases the latch 160 and thereafter operates the hydraulic control to extend the cylinder 52 while driving slowly in the forward direction until the beam 44 moves to the rearmost position. Continued extension moves the beam to the outermost position wherein the forward inside corner of the implement 12 is closely adjacent the rear outside corner of the implement 10 and the bracket 88 is in position to receive the hook-like member 84. Continued operation of the hydraulic control to extend the cylinders causes the front hitch beam 56 to rotate toward the field-working position and generally center the towing vehicle between the implements 10 and 12. At the same time, the activating structure 90 moves the brace arm 80 down until the member 84 latches over the bracket 88 so that the implements are in position to operate in the field.

To move the implements to the transport position, the operator reverses the procedure and moves the hydraulic control to retract the cylinders 52 and 62. The cylinder 62 retracts first until the activating structure releases the brace structure from the beam 44. The cylinders 52 and 62 are retracted until the beam 44 and the beam 56 move into the transport positions wherein the implements 10 and 12 are centered one behind the other and centrally behind the towing vehicle as shown in FIG. 1. At the same time, the activating structure 90 moves the arm 80 to the storage position.

Having described the preferred embodiment, it will become apparent to one skilled in the art that various modifications may be made while not departing from the scope of the invention as defined in the claims which follow.

We claim:

1. Hitch structure for towing first and second framed implements forwardly one behind the other in a transport position and in a generally side-by-side relationship in a field-working position, the implements each having a frame with end members and front and rear frame members, the hitch structure comprising:

an elongated rear hitch having a forward end and a rearward end, the rearward end adapted for connection to and towing of the second implement;

hinge means for pivotally connecting the forward end of the rear hitch to one side of the rear frame member of the first implement adjacent a corresponding end member thereof;

a fore-and-aft extending forward hitch including an aft end pivotally connected to the front frame member of the first implement at a location offset toward the one side of the implement, and a forward towing end adapted for connection to a towing vehicle;

means for rocking the forward hitch about an upright axis between a first position corresponding to the transport position, wherein the forward towing end is generally centered with respect to the first implement, and a second position corresponding to the field-working position wherein the forward towing end is offset toward the one side generally centered between the implements, wherein the upright axis is centrally located between said corresponding end member and the center of the first implement adjacent the front frame member; and means for rocking the rear hitch between first and second positions corresponding to the transport and field-working positions, respectively, wherein the rearward end is generally centered with respect to the first implement when the rear hitch is in the first position and is offset outwardly of the corresponding end member of the first implement when the rear hitch is in the second position.

2. The invention as set forth in claim 1 further comprising a movable hitch brace connected to the frame of the first implement adjacent the front member and the corresponding end member, and means for automatically moving the brace into engagement with the rear hitch as the rear hitch approaches the second position.

3. The invention as set forth in claim 2 wherein the brace is pivotally connected to the corresponding end of the first implement for rocking about a fore-and-aft extending axis, and the means for automatically moving the brace comprises a link connected to the brace and movable in response to movement of the forward hitch toward the second position.

4. The invention set forth in claim 1 wherein the hinge means comprises a hinge having a pivotal axis and horizontally rotatable through an angle of approximately 180 degrees as the rear hitch rocks between the first and second positions.

5. The invention as set forth in claim 4 wherein the hinge includes a bracket connected to the rear corner of the first implement, and a vertical pivot connecting the rear hitch to the bracket, and first and second toggle links pivotally connected to the bracket and rear hitch, respectively, the toggle links pivotally connected at their opposite ends to each other, the means for rocking the rear hitch comprising a hydraulic cylinder connected between the toggle links and the first implement.

6. The invention as set forth in claim 1 wherein the rear hitch includes two portions offset at an angle with respect to each other such that the rear hitch, when in the first position, extends rearwardly and inwardly from the side of the first implement and, when in the second position, extends forwardly and outwardly from the side of the implement.

7. The invention as set forth in claim 6 including means pivotally connecting the first and second rear hitch portions for facilitating relative vertical motion between the implements in both the field-working and transport positions.

8. Hitch structure for towing first and second implements forwardly one behind the other in a transport position and in a side-by-side relationship in a field-working position, the implements including generally rectangular frames with front and rear frame members and outer end members and front and rear corners, the hitch structure comprising:

an elongated rear hitch having a forward end and a rearward end, the rearward end adapted for connection to the second implement;

hinge means for pivotally connecting the forward end of the rear hitch to one side of the first implement near one rear corner thereof;

a fore-and-aft extending forward hitch including an aft end pivotally connected to the first implement at a location forward of the hinge means, and a forward towing end adapted for connection to a towing vehicle;

means for rocking the forward hitch about an upright axis between a first position corresponding to the transport position, wherein the forward towing end is generally centered with respect to the first implement, and a second position corresponding to the field-working position wherein the forward towing end is offset toward the one side of the implement and generally centered between the implements in the field-working position, wherein the upright axis is located between a corresponding end member and the center of the first implement adjacent the front frame member; and means for rocking the rear hitch through an angle of substantially greater than ninety degrees between first and second positions corresonding to the transport and field-working positions, respectively, wherein the rear hitch is located substantially entirely rearwardly of the first implement and the rearward end is generally centered with respect to the first implement when the rear hitch is in the first position, and is offset outwardly of the first implement and substantially entirely rearwardly of the first corner of the implement when the rear hitch is in the second position.

9. The invention as set forth in claim 8 wherein the hinge means comprises a hinge having an upright pivotal axis fixed relative to the first implement closely adjacent the one rear corner, the hinge foldable approximately 180 degrees between the transport and field-working positions.

10. The invention as set forth in claim 9 wherein the rear hitch includes hitch beam structure having a length approximately equal to one-half the width of the first implement.

11. The invention as set forth in claim 8 including a hitch brace pivotally connected to the one side of the first implement for rocking between a storage position offset from the rear hitch and a bracing position extending between the rear hitch and the corresponding front corner of the first implement.

12. The invention as set forth in claim 11 including activating structure responsive to movement of the implements toward the field-working position for automatically moving the brace toward the bracing position.

13. The invention as set forth in claim 12 wherein the activating structure includes a link connected between the forward hitch and the hitch brace.

14. The invention as set forth in claim 11 including means for connecting the hitch brace to the one side for rocking about a fore-and-aft extending axis, the hitch brace extending rearwardly and upwardly from the means for connecting when in the storage position, and rearwardly and outwardly from the means for connecting when in the bracing position.

15. The invention as set forth in claim 14 including means responsive to the rocking of the forward hitch for automatically rocking the hitch brace between the storage and bracing positions as the forward hitch is rocked between the first and second positions.

16. Agricultural implement structure adapted for towing forwardly by a towing vehicle in a wide field-working configuration and a narrowed transport position, the implement structure, comprising:

first and second framed implements having generally rectangular main frames defining transverse front and rear members and fore-and-aft extending side members with front and rear corners;

rear hitch structure including an elongated hitch beam having a first end pivotally connected to the rear corner of the first implement, a second end connected to the second implement, and means for rocking the beam about the first end between an outwardly extending position corresponding to the field-working position wherein the second end extends substantially outwardly of the rear corner and rearwardly of the front corner of the first implement, and an inward position corresponding to the transport position generally alongside and substantially entirely behind the rear transverse frame member of the first implement, and front hitch structure including a front hitch beam having an aft end pivotally connected to the front member of the first implement and a forward end adapted for connection to the towing vehicle, and means for rocking the front hitch beam about an upright axis between a first position corresponding to the field-working position wherein the forward end is offset in a first direction toward the side of the first implement and a second position corresponding to the transport position wherein the forward end is offset in the direction opposite the first direction wherein the upright axis is centrally located between a corresponding end member and the center of the first implement adjacent the front frame member.

17. The invention as set forth in claim 16 wherein the total lateral length encompassed between the first and second ends of the rear hitch is equal to approximately half the width of the first implement, and the second end is generally centered behind the first implement when the rear hitch beam is in the inward position.

18. The invention as set forth in claim 17 wherein, when the front hitch beam is in the second position, the forward end is centered with respect to the first implement so that the first and second implements are towable centrally in line behind the vehicle.

19. The invention as set forth in claim 16 wherein the means for rocking the front hitch beam and the means for rocking the rear hitch beam comprise first and second hydraulic cylinders, respectively, and means for operating the cylinders to automatically and sequentially move the hitch beams between the field-working and transport positions.

20. The invention as set forth in claim 19 wherein the first and second cylinders are plumbed in parallel.

* * * * *